SARAH RUEGER, OF KANSAS CITY, MISSOURI.

Letters Patent No. 84,580, dated December 1, 1868.

IMPROVED MAMMALIAL LINIMENT.

The Schedule referred to in these Letters Patent and making part of the same.

*To all whom it may concern:*

Be it known that I, SARAH RUEGER, of Kansas City, in the county of Jackson, and State of Missouri, have made certain new and useful Improvements in Mammalial Liniment; and I do hereby declare that the following is a full and clear description thereof, reference being had to the accompanying drawings, and to the letters of reference marked thereon.

This invention relates to a wash or liniment for keeping in a healthy condition the mammalial glands of ladies, at seasons of maternity.

It consists of a combination of a solution of tea and whiskey, compounded, as hereinafter described, and applied to the nipples and mammals by bathing, or by saturated cloths.

To enable those skilled in the art to make and use my improved wash or liniment, I will proceed to describe its construction and mode of application.

I take one ounce of the best Imperial tea and one ounce of best Bourbon whiskey, to which I add eight ounces of boiling water, and then boil the mixture for fifteen minutes, after which I strain it off, and then boil the decoction, thus prepared, down to two ounces, and when this is cold, add to it two ounces of best whiskey, and the preparation is complete.

The mode of application will be by frequent bathing of the parts, or by the use of a woollen cloth saturated in the wash or liniment, prepared, as above described, and applied so as to cover the mammals.

Having described my invention,

What I claim, is—

The combination of the materials, in the proportions and in the manner herein described, and for the purpose set forth.

SARAH RUEGER.

Witnesses:
    JOS. L. NORMAN,
    W. SCOTT FORD.